(12) United States Patent
Guignon et al.

(10) Patent No.: US 12,423,401 B2
(45) Date of Patent: Sep. 23, 2025

(54) DEVICE AND METHOD FOR AUTHENTICATING A USER OF A FIRST ELECTRONIC DEVICE CONNECTED TO A SECOND ELECTRONIC DEVICE BY USING A RELATIVE CHARACTERISTIC PARAMETER

(71) Applicant: ORANGE, Issy-les-Moulineaux (FR)

(72) Inventors: Richard Guignon, Châtillon (FR); Sébastien Poivre, Châtillon (FR); Gildas Belay, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 97 days.

(21) Appl. No.: 18/002,970

(22) PCT Filed: Jun. 22, 2021

(86) PCT No.: PCT/FR2021/051127
§ 371 (c)(1),
(2) Date: Dec. 22, 2022

(87) PCT Pub. No.: WO2021/260314
PCT Pub. Date: Dec. 30, 2021

(65) Prior Publication Data
US 2023/0237139 A1    Jul. 27, 2023

(30) Foreign Application Priority Data

Jun. 23, 2020   (FR) ..................................... 2006535

(51) Int. Cl.
*G06F 21/35*   (2013.01)
*G06F 21/43*   (2013.01)

(52) U.S. Cl.
CPC .............. *G06F 21/35* (2013.01); *G06F 21/43* (2013.01)

(58) Field of Classification Search
CPC .......... G06F 21/35; G06F 21/43; G06F 21/31; G06F 21/34
See application file for complete search history.

(56) References Cited

U.S. PATENT DOCUMENTS 6,222,759 B1 *  4/2001  Chi-Hung  ..........  G11C 16/0425
                                              365/185.01
6,766,456 B1    7/2004  McKeeth
(Continued)

OTHER PUBLICATIONS

Ceenu George et al., "Seamless and Secure VR: Adapting and Evaluating Established Authentication Systems for Virtual Reality", DOI: 10.14722/usec.2017.23028 external link, Feb. 26, 2017 (Feb. 26, 2017), Retrieved from the Internet: URL:https://www.internetsociety.org/sites/default/files/usec2017_01_4_George_paper.pdf, XP055370563.
(Continued)

*Primary Examiner* — Quazi Farooqui
(74) *Attorney, Agent, or Firm* — David D. Brush; Westman, Champlin & Koehler, P.A.

(57) ABSTRACT

Authentication of a user of a first electronic device, such as a communication terminal or a virtual or augmented reality headset. The first electronic device is connected to a second electronic device, the first electronic device and the second electronic device being separately portable by the user. The authentication device includes an analyser capable of checking whether a detected value of a relative characteristic parameter of the second electronic device corresponds to a stored value of this relative characteristic parameter of the second electronic device associated with an identifier of a user requiring an authentication, the relative characteristic parameter corresponding to the characteristic parameter of the second electronic device measured relative to the characteristic parameter of the first electronic device.

15 Claims, 5 Drawing Sheets

(56) References Cited

U.S. PATENT DOCUMENTS

| | | | |
|---|---|---|---|
| 9,961,547 B1* | 5/2018 | Molina-Markham ... | H04M 1/67 |
| 11,605,255 B2* | 3/2023 | Maclean ................. | G06V 40/20 |
| 2014/0378159 A1* | 12/2014 | Dolbakian .......... | G06F 16/9537 |
| | | | 455/456.1 |
| 2018/0107816 A1 | 4/2018 | Wu et al. | |
| 2018/0302227 A1* | 10/2018 | Seegebarth ........... | H04W 12/06 |
| 2018/0353086 A1* | 12/2018 | Turner .................... | G01S 13/50 |

OTHER PUBLICATIONS

Niehorster Diederick C. et al., "The Accuracy and Precision of Position and Orientation Tracking in the HTC Vive Virtual Reality System for Scientific Research", vol. 8, No. 3, DOI: 10.1177/2041669517708205 external link ISSN:2041-6695, May 18, 2017 (May 18, 2017), I-Perception, Retrieved from the Internet: URL:http://journals.sagepub.com/doi/full-XML/10.1177/2041669517708205, XP055779937.

International Search Report dated Sep. 7, 2021, for corresponding International Application No. PCT/FR2021/051127, filed Jun. 22, 2021.

Written Opinion of the International Searching Authority dated Sep. 7, 2021, for corresponding International Application No. PCT/FR2021/051127, filed Jun. 22, 2021.

English translation of the Written Opinion of the International Searching Authority dated Sep. 16, 2021 for corresponding International Application No. PCT/FR2021/051127, filed Jun. 22, 2021.

* cited by examiner

DEVICE AND METHOD FOR AUTHENTICATING A USER OF A FIRST ELECTRONIC DEVICE CONNECTED TO A SECOND ELECTRONIC DEVICE BY USING A RELATIVE CHARACTERISTIC PARAMETER

CROSS-REFERENCE TO RELATED APPLICATIONS

This Application is a Section 371 National Stage Application of International Application No. PCT/FR2021/051127, filed Jun. 22, 2021, which is incorporated herein by reference in its entirety and published as WO 2021260314 on Dec. 30, 2021, not in English.

TECHNICAL FIELD

The invention relates to the authentication of a user of a first portable electronic device, such as a communication terminal or a virtual or augmented reality headset.

PRIOR ART

Authentication allows a request for access to a device (computer, smartphone, connected object, etc.) or to a service (website, application, cloud, video on demand (VoD), teleconference, collaborative space, etc.) by a person to be legitimized in order to grant access to the resources (system, communication network, applications, content, etc.) of the device or of the service.

To this end, authentication involves checking the identity of the person requesting access to the device or to the service by checking access data such as a password, a datum provided by an item of identification such as a smart card, an electronic certificate, etc., a biometric datum (fingerprints, iris, face), a signature or a gesture.

The type of access data generally depends on the level of security of the device or service to be accessed and on the device used to provide these access data.

Over the coming years, virtual reality and augmented reality systems have the potential for particular development. However, the use of such virtual and/or augmented reality systems in some uses, in particular professional uses, sometimes requires authenticating the user of these systems. For example, access to a virtual reality meeting by a participant requires authenticating this participant before allowing them to access the meeting and, in particular, the documents exchanged during this meeting. Furthermore, if this participant wishes to share some of their documents, they must be able to securely access them from the virtual meeting without the other participants also having access thereto.

However, currently, authenticating users for communication devices and/or services provided via communication networks is still very often based on the use of a keyboard and/or of a mouse to enter a user identifier (also called login) and a password or an authentication code.

Indeed, the use of biometric data has long been limited as a result of sensors not being available on the communication devices and as a result of significant computation costs when recognizing these biometric data. Currently, in particular in the field of mobile telephony, authenticating users using fingerprints is being developed, and authenticating users using facial recognition is slowly beginning. However, the latter is not always reliable, thus demonstrating the difficulties of implementing authentication other than by the conventional login/password.

However, within the context of virtual reality, the use of the login/password still prevails irrespective of the type of headset: headset connected to a computer (such as Oculus Rift™ and HTC Vive™) or an autonomous headset (such as Oculus Quest™, etc.).

In the case of the headset connected to a computer, a keyboard and/or a mouse are often available to allow the user to enter their login/password. However, the user experience is degraded since the user must switch from the computer to the headset when authenticating. With further reference to our example of a virtual meeting, the user will have to remove their headset in order to enter their login/password to access their personal documents in order to share some of them with the other participants, i.e., they will have to "leave" the meeting even if the headset remains connected thereto. Indeed, the user not only will no longer see, or no longer hear what is happening in the virtual meeting, but they will no longer be able to participate until they have put their headset back on. Ideally, the virtual reality experience involves being immersed in the headset at all times.

In the case of the autonomous headset, the user does not have a physical keyboard allowing the authentication information to be easily entered. Indeed, a virtual keyboard can be displayed to allow the user to enter their authentication information, but the interaction is not as natural as with a real keyboard, generating authentication errors.

DISCLOSURE OF THE INVENTION

One of the aims of the present invention is to address the disadvantages/deficiencies of the prior art/to provide improvements over the prior art.

An aim of the invention is a device for authenticating a user of a first electronic device connected to a second electronic device, the first electronic device and the second electronic device being separately portable by the user, the authentication device comprising:

an analyzer capable of checking whether a detected value of a relative characteristic parameter of the second electronic device corresponds to a stored value of this relative characteristic parameter of the second electronic device associated with an identifier of a user requesting an authentication, with the relative characteristic parameter corresponding to the characteristic parameter of the second electronic device measured relative to the characteristic parameter of the first electronic device.

Thus, new biometric data can be used to identify the user, since the relative position of the first electronic device relative to the second electronic device, both worn by the user, depends on biometric data of the user. For example, if the second electronic device is a watch or a joystick and the first electronic device is a virtual reality headset, the relative characteristic parameter can be the distance between this second electronic device and the headset, which particularly depends on arm length, which is specific to each individual, and on the position of the arm during the authentication.

Another advantage of the invention is that it does not require providing the first electronic device and the second electronic device with specific sensors, but it allows the sensors already implemented therein to be used, such as a position sensor, accelerometers, etc., to detect the value of the relative characteristic parameter.

Furthermore, the authentication is thus adapted to the capabilities of the first electronic device, in particular when it is an immersive device such as a virtual reality headset, for which entering a password is complex since detecting entering on a three-dimensional virtual keyboard in an immersive environment is imprecise and therefore a source of error.

Advantageously, the analyzer is capable of checking whether a series of detected values of a relative characteristic parameter of the second electronic device corresponds to a series of stored values of this relative characteristic parameter of the second electronic device associated with an identifier of a user requesting authentication.

Thus, the authentication is improved by using a series of values of a characteristic parameter. For example, the series of values is obtained by a series of gestures performed by the user. If the characteristic parameter is the relative position of the first electronic device relative to the second electronic device (for example, a virtual reality headset relative to a virtual reality joystick or a virtual reality garment: glove, boot, etc.), the detected values equally depend on the order in which the gestures are performed, the type of gestures performed and the morphology of the user in each of these gestures: hand-head distances in different arm positions: arm stretched along the body, then arm folded 45° forward, arm folded fist to shoulder, arm stretched in the air, etc.

Advantageously, the analyzer is capable of checking the values of several relative characteristic parameters of at least one second electronic device.

Thus, not only the morphology of the user but also their behavior can be used: for example, the relative speed of the hand relative to the head and/or the relative acceleration of the hand relative to the head between two positions of the hand. This further improves the authentication.

Advantageously, the authentication device comprises at least one from among the devices for providing a relative characteristic parameter of the second electronic device:
 a detector for detecting a relative characteristic parameter of the second electronic device;
 a receiver for receiving a detected value of the relative characteristic parameter of the second electronic device, with the receiver receiving a value originating from a detector for detecting a relative characteristic parameter of the second electronic device implemented in the second electronic device;
 a receiver for receiving a detected value of the relative characteristic parameter of the second electronic device, with the receiver receiving a value originating from a detector for detecting a relative characteristic parameter of the second electronic device implemented in the first electronic device.

Advantageously, the detector comprises:
 a controller capable of commanding at least one remote sensor for detecting values of the characteristic parameter of a remote device, with the sensor being implemented in the remote device.

Advantageously, the detector comprises:
 a sensor capable of measuring a value of the relative characteristic parameter of the second electronic device.

Advantageously, the relative characteristic parameter is made up of at least one of the following characteristic parameters:
 relative position of the second electronic device relative to the first electronic device;
 relative orientation of the second electronic device relative to the first electronic device;
 relative speed of the second electronic device relative to the first electronic device;
 relative acceleration of the second electronic device relative to the first electronic device.

Advantageously, the first electronic device is made up of one from among the following main portable devices:
 a portable communication terminal;
 a tablet;
 a portable console;
 a virtual reality headset;
 an augmented reality headset.

Advantageously, the second electronic device is made up of one from among the following secondary portable devices:
 a portable peripheral;
 a portable connected object;
 a virtual reality joystick;
 an augmented reality joystick.

A further aim of the invention is a first electronic device of a user, with the first electronic device of the user being connected to a second electronic device, with the first electronic device and the second electronic device being separately portable by the user, the first electronic device comprising:
 a device for authenticating the user of the first electronic device capable of checking whether a detected value of a relative characteristic parameter of the second electronic device corresponds to a stored value of this relative characteristic parameter of the second electronic device associated with an identifier of a user requesting an authentication, with the relative characteristic parameter corresponding to the characteristic parameter of the second electronic device measured relative to the characteristic parameter of the first electronic device.

A further aim of the invention is a method for authenticating a user of a first electronic device connected to a second electronic device, with the first electronic device and the second electronic device being separately portable by the user, the authentication method comprising:
 checking whether a detected value of a relative characteristic parameter of the second electronic device corresponds to a stored value of this relative characteristic parameter of the second electronic device associated with an identifier of a user requesting authentication, with the relative characteristic parameter corresponding to the characteristic parameter of the second electronic device measured relative to the characteristic parameter of the first electronic device.

A further aim of the invention is a method for registering a user of a first electronic device connected to a second electronic device, with the first electronic device and the second electronic device being separately portable by the user, the registration method comprising:
 storing, in combination with an identifier of the user, at least one value of a relative characteristic parameter of the second electronic device, with the relative characteristic parameter corresponding to the characteristic parameter of the second electronic device measured relative to the characteristic parameter of the first electronic device.

Advantageously, the registration method comprises:
 measuring at least one value of the relative characteristic parameter of the second electronic device, with the measured value being stored directly or indirectly.

Advantageously, the registration method comprises:
computing a statistical value of the relative characteristic parameter of the second electronic device, with the statistical value being stored.

Advantageously, according to one implementation of the invention, the various steps of the method according to the invention are implemented by software or by a computer program, with this software comprising software instructions intended to be executed by a data processor of a device forming part of the invention and being designed to control the execution of the various steps of this method.

Therefore, the invention also relates to a program comprising program code instructions for executing the steps of the authentication method and/or of the registration method when said program is executed by a processor.

This program can use any programming language and be in the form of source code, object code or intermediate code between source code and object code, such as in a partially compiled format or in any other desirable format.

BRIEF DESCRIPTION OF THE DRAWINGS

The features and advantages of the invention will become more clearly apparent from reading the description, which is provided by way of an example, and the corresponding figures, which show.

DESCRIPTION OF THE EMBODIMENTS

Figure 1:
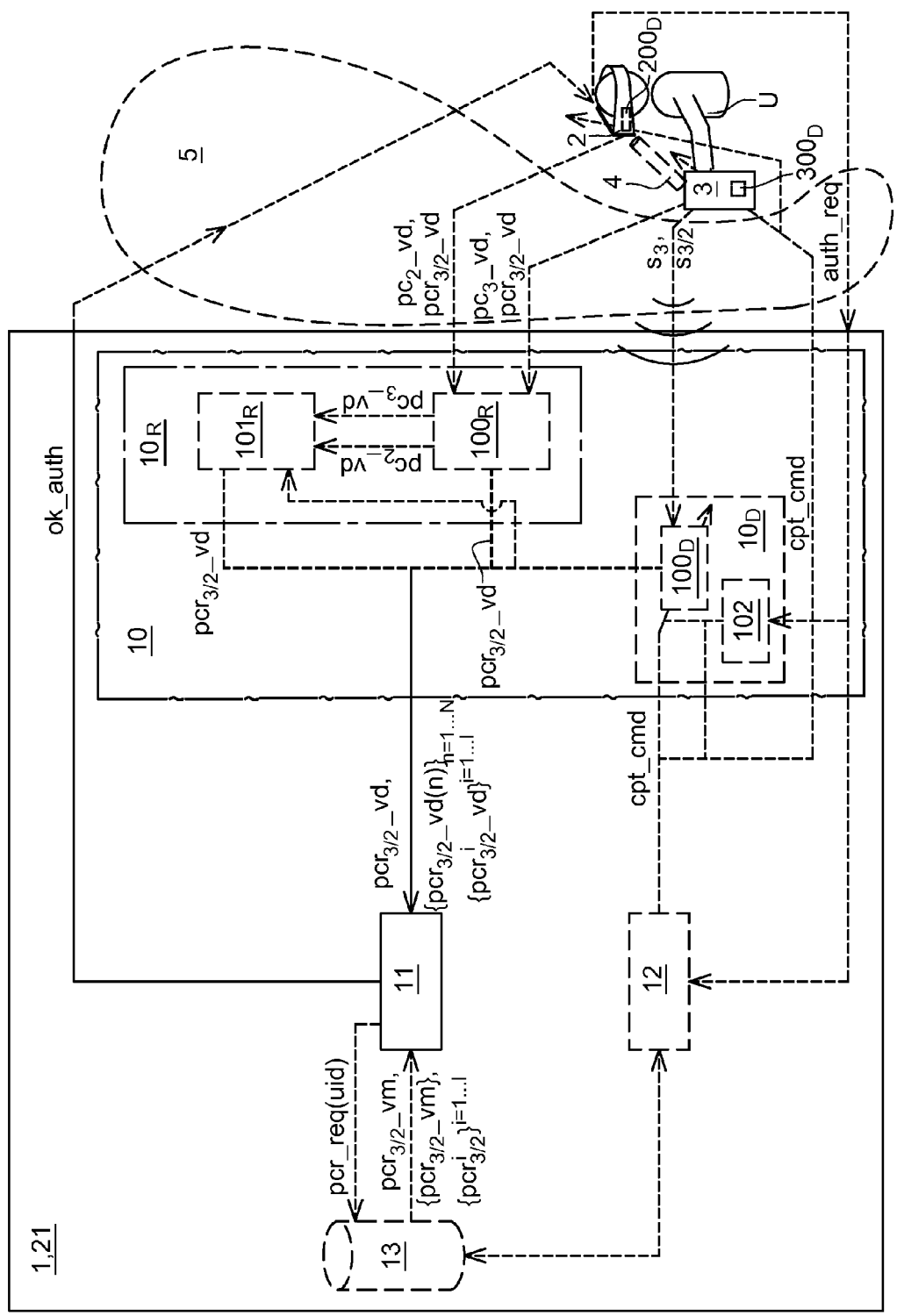
FIG. 1, a simplified diagram of an authentication device according to the invention.

FIG. 1 shows a simplified diagram of an authentication device according to the invention.

The authentication device 1, 21 is a device capable of authenticating a user U of a first electronic device 2 connected to a second electronic device 3. The first electronic device 2 and the second electronic device 3 are separately portable by the user U. The authentication device 1, 21 comprises:

an analyzer 11 capable of checking whether a detected value $prc_{3/2}\_vd$ of a relative characteristic parameter of the second electronic device corresponds to a stored value $prc_{3/2}\_vm$ of this relative characteristic parameter of the second electronic device associated with an identifier uid of a user U requesting authentication auth_req, with the relative characteristic parameter $prc_{3/2}$ corresponding to the characteristic parameter $pc_3$ of the second electronic device measured relative to the characteristic parameter $pc_2$ of the first electronic device.

In particular, the analyzer 11 is capable of checking whether a series of detected values $\{prc_{3/2}\_vd(n)\}_{n=1\ldots N}$ of a relative characteristic parameter of the second electronic device corresponds to a series of stored values $\{prc_{3/2}\_vm(n)\}_{n=1\ldots N}$ of this relative characteristic parameter of the second electronic device associated with an identifier uid of a user requesting authentication.

In particular, the analyzer 11 is capable of checking the values $\{prc_{3/2}{}^i\_vd\}^{i=1\ldots I}$, $\{prc_{3/2}{}^i\_vd(n)\}_{n=1\ldots N}^{i=1\ldots I}$ of several relative characteristic parameters of at least one second electronic device 3.

In particular, the stored value has been stored prior to the implementation of the authentication by the authentication device 1 and/or prior to an access request triggering authentication by the authentication device according to the invention.

In particular, the stored value has been stored by a user register when initially accessing a product or service requesting authentication.

In particular, the authentication device 1, 21 comprises at least one from among the devices 10 for providing a relative characteristic parameter of the second electronic device 2:

a sensor $100_D$ for detecting a relative characteristic parameter of the second electronic device;

a receiver $100_R$ for receiving a detected value $prc_{3/2}\_vd$ of the relative characteristic parameter of the second electronic device, the receiver $100_R$ receiving a value $prc_{3/2}\_vd$ originating from a sensor $300_D$ for detecting a relative characteristic parameter of the second electronic device implemented in the second electronic device 3;

a receiver $100_R$ for receiving a detected value $prc_{3/2}\_vd$ of the relative characteristic parameter of the second electronic device, the receiver $100_R$ receiving a value originating from a sensor $200_D$ for detecting the relative characteristic parameter of the second electronic device implemented in the first electronic device 2;

a computer $10_R$ for computing a detected value $prc_{3/2}\_vd$ of the relative characteristic parameter of the second electronic device comprising:

a receiver $100_R$ for receiving a detected value $pc_3\_vd$ of the characteristic parameter of the second electronic device originating from the second electronic device 3 and a detected value $pc_2\_vd$ of the characteristic parameter of the first electronic device originating from the first electronic device 2; and a basic computer $101_R$ capable of determining a value $prc_{3/2}\_vd$ of the relative characteristic parameter of the second electronic device as a function of the received detected value $pc_3\_vd$ of the characteristic parameter of the second electronic device and of the received detected value $pc_2\_vd$ of the characteristic parameter of the first electronic device.

In particular, the detector $10_D$ comprises:

a controller 102 capable of commanding cpt_cmd at least one remote sensor $200_D$, $300_D$ for detecting values $prc_{3/2}\_vd$ of the characteristic parameter of a remote device 2, 3, with the sensor $200_D$, $300_D$ being implemented in the remote device 2, 3.

In particular, the detector $10_D$ comprises:
a sensor $100_D$ capable of measuring a value $pcr_{3/2}\_vd$ of the relative characteristic parameter of the second electronic device.

FIG. 1 shows an example of a communication architecture implementing the invention, In this example, the authentication device 21, 1 of the invention is implemented either in a first electronic device 2 worn by a user U, or outside this device, for example, in a separate authentication device 1. The separate authentication device 1 is particularly either co-located with the first electronic device 2, or remote from this first electronic device. In the case of a separate remote authentication device 1, the authentication device 1 is connected to the first electronic device, in particular via a communication network 5.

The second electronic device 3, also worn by the user U, is connected to the first electronic device 2 either by a wired route (particularly using a peripheral connection such as a USB or Ethernet connector), or by a local network (Bluetooth, Wi-Fi, etc.). Optionally, in the case of a separate remote authentication device 1, the second electronic device 3 is connected to the authentication device 1 via a communication network 5.

The user U uses the first electronic device 2 to access a product or services, in particular to access the first electronic device, a third electronic device (not shown in FIG. 1), for example, a secure hard disk, a home automation management device, a TV decoder, also called Set Top Box, etc., which may or may not be local, or to a service such as a content provision service, a video on demand service, a document management service in a remote server (or cloud), an Internet site, an application, etc.

For example, the product or the device implementing the service to which the first electronic device 2 requests access, in particular the first electronic device 2 as shown in FIG. 1, requests authentication auth_req, following an access request by the first electronic device 2, of the user U from the authentication device 1, 21 before access is granted.

In particular, the authentication device 1, 21 comprises a controller 12, 102 capable of commanding cpt_cmd a measurement of at least one relative characteristic parameter $pcr_{3/2}$. This command triggers cpt_cmd the activation of one or more detector(s), in particular:
a sensor $100_D$ of the authentication device 1 when it is implemented in the first electronic device 2 (with the sensor $100_D$ then forming the sensor $200_D$ of the first electronic device) or is co-located with the first electronic device 2; and/or
a sensor $200_D$ of the first electronic device 2; and/or
a sensor $300_D$ of the second electronic device 3.

In particular, the one or more detector(s) $100_D$, $200_D$, $300_D$ comprise one or more sensor(s) (not shown) as a function of the number and/or the type of characteristic parameters to be detected. For example, the sensor of the sensor $100_D$ receives signals $s_3$, $s_{3/2}$ originating from the second electronic device 3, as shown in FIG. 1, and/or from the first electronic device 2 (not shown). These signals $s_3$, $s_{3/2}$ are particularly visual signals detected by a camera of the sensor $100_D$ or are radio signals detected by a receiver, in particular a Bluetooth receiver, of the sensor $100_D$ allowing the sensor $100_D$ to determine, for example, the position $pc_3=pos_3$ and/or the distance $pc_3=d_3$ of the second electronic device 3 or even the position $pc_{3/2}=pos_{3/2}$ and/or the distance $pc_{3/2}=d_{3/2}$ of the second electronic device 3 relative to the first electronic device 2.

The sensor $100_D$, $200_D$, $300_D$ provides the authentication device 1, 21 with the detected value $pc_2\_vd$, $pc_3\_vd$ of a characteristic parameter, or even with the detected value $pcr_{3/2}\_vd$ of a relative characteristic parameter.

When one of the detectors $200_D$, $300_D$ is not implemented in the authentication device 1, 21, the authentication device 1, 21 comprises at least one receiver $100_R$ receiving at least the one or more detected value(s) $pc_2\_vd$, $pc_3\_vd$ of one or more characteristic parameter(s), or even the one or more detected value(s) $pcr_{3/2}\_vd$ of one or more relative characteristic parameter(s) originating from the first electronic device 2 and/or the second electronic device implementing them.

When the characteristic parameter $pc_2$, $pc_3$ for which the value $pc_2\_vd$, $pc_3\_vd$ is detected is not a relative characteristic parameter $pcr_{3/2}$ of the second electronic device, the authentication device 1, 21 comprises at least one basic computer $101_R$ capable of determining, as a function of the received detected values $pc_2\_vd$, $pc_3\_vd$, the detected value $pcr_{3/2}\_vd$ of the relative characteristic parameter of the second electronic device.

In particular, the authentication device 1, 21 comprises a loader 10 for loading values of relative characteristic parameters, also called device for providing relative characteristic parameters of the second device. This loader 10 comprises the detector $10_D$ and/or one or more receiver(s) $100_R$ and/or a basic computer $101_R$. Optionally, the loader 10 comprises a computer $10_R$ implementing one or more receiver(s) $100_R$ and/or the basic computer $101_R$.

For example, in the case whereby the invention uses only one relative characteristic parameter, the loader 10 comprises:
either only a detector $10_D$ capable of detecting the value $pcr_{3/2}\_vd$ of a relative characteristic parameter;
or a detector $10_D$ capable of detecting the value $pc_2\_vd$ of a characteristic parameter of the first electronic device and the value $pc_3\_vd$ of a characteristic parameter of the second electronic device and a basic computer $101_R$;
or one or more receiver(s) $100_R$ capable of receiving the value $pc_2\_vd$ of a characteristic parameter of the first electronic device originating from the first electronic device 2 and the value $pc_3\_vd$ of a characteristic parameter of the second electronic device originating from the second electronic device 3 and a basic computer $101_R$ (the receivers $100_R$ and the basic computer $101_R$ optionally being implemented in a computer $10_R$);
or only a receiver $100_R$ capable of receiving the value $pcr_{3/2}\_vd$ of a relative characteristic parameter originating from the first electronic device 2 or the second electronic device 3.

In the case whereby the invention uses several relative characteristic parameters, the loader 10 optionally comprises:
either only a detector $10_D$ capable of detecting the values $\{pcr_{3/2}{}^i\_vd\}^{i=1\cdots I}$ of all the relative characteristic parameters;
or several detectors $10_D$, with each detector being capable of detecting a value $\{pcr_{3/2}{}^i\_vd\}^i$ of one or more of the relative characteristic parameter(s) from among the set of relative characteristic parameters such that the set of detectors $10_D$ is capable of detecting the values $\{pcr_{3/2}{}^i\_vd\}^{i=1\cdots I}$ of all the relative characteristic parameters;
or one or more detector(s) $10_D$ and one or more receiver(s) $10_R$, with each detector being capable of detecting a value $\{pcr_{3/2}{}^i\_vd\}^i$ of one or more of the relative characteristic parameter(s) from among the set of relative characteristic parameters and each receiver being capable of receiving a value $\{pcr_{3/2}{}^i\_vd\}^i$ of one or more of the relative characteristic parameter(s) from among the set of relative characteristic parameters, such that the set of detectors $10_D$ and receivers $10_R$ is able to provide the values $\{pcr_{3/2}{}^i\_vd\}^{i=1 \cdots I}$ of all the relative characteristic parameters;

or one or more detector(s) $10_D$ for detecting characteristic parameters or relative characteristic parameters and/or one or more receiver(s) $10_R$ for receiving characteristic parameters or relative characteristic parameters, and, if applicable, one or more basic computers $101_R$, with each detector being capable of detecting a value $\{pc_3{}^i\_vd\}^i$, $\{pc_2{}^i\_vd\}^i$ of one or more of the characteristic parameter(s) and/or a value $\{pcr_{3/2}{}^i\_vd\}^i$ of one or more of the relative characteristic parameter(s) from among the set of relative characteristic parameters, with each receiver being capable of receiving a value $\{pc_3{}^i\_vd\}^i$, $\{pc_2{}^i\_vd\}^i$ of one or more of the characteristic parameter(s) and/or a value $\{pcr_{3/2}{}^i\_vd\}^i$ of one or more of the relative characteristic parameter(s) from among the set of relative characteristic parameters, and with each basic computer $101_R$ being capable of determining a value $\{pcr_{3/2}{}^i\_vd\}^i$ of one or more of the relative characteristic parameter(s) from among the set of relative characteristic parameters, such that the set of detectors $10_D$, receivers $10_R$ and basic computers $101_R$ is able to provide the values $\{pcr_{3/2}{}^i\_vd\}^{i=1 \cdots I}$, etc., of all the relative characteristic parameters.

The analyzer 11 then receives at least one value $\{pcr_{3/2}{}^i\_vd(n)\}_{n=1 \ldots N}^{i=1 \cdots I}$ of at least one relative characteristic parameter particularly provided by the loader 10 and/or the one or more detector(s) $10_D$ and/or the computer $10_R$ and/or the one or more receiver(s) $100_R$. The analyzer 11 particularly comprises a second search engine (not shown) capable of searching for one or more value(s) $\{pcr_{3/2}{}^i\_vm(n)\}_{n=1 \ldots N}^{i=1 \cdots I}$ of one or more stored relative characteristic parameters in combination with a user identifier uid.

In particular, the authentication request auth_req received by the authentication device comprises a user identifier uid.

Alternatively, the authentication device 1 comprises an identification message generator (not shown). The identification message is reproduced for the intention of the user by a reproduction interface of the authentication device and/or of the first electronic device 2 and/or of a third electronic device separate from the first electronic device (for example, loud speakers placed in the room where the user U is located, a television or computer screen when the user is wearing an augmented reality headset 2, or a smartphone 2). The user identifies themselves particularly by providing a vocal identifier. The authentication device 1 then particularly comprises a voice recognition device or a speech-to-text converter providing the user identifier uid.

In another alternative, the authentication device comprises a first search engine (not shown) for searching for a user identifier previously stored with a terminal identifier.

When the second electronic device transmits a terminal identifier with the authentication request, the first search engine extracts the terminal identifier from the authentication request auth_req and uses it to search for the user identifier uid stored in combination therewith (for example, in a user database 13).

In particular, the user identifier was stored by a user register when initially accessing a product or service requesting authentication with the stored value of the relative characteristic parameter.

Depending on the result of the check executed by the analyzer 11, the analyzer 11 may or may not provide an authentication message ok_auth. In particular, the authentication message ok_auth is able to trigger the access to the product or service requested by the user U.

In particular, the analyzer 11 provides, when the detected and stored values do not match, an authentication failure message n_auth (not shown). The failure message particularly triggers the reproduction of a message intended for the user U: either an access failure message or an authentication failure message able to optionally allow a new authentication attempt.

In particular, the authentication device 1 according to the invention is implemented in a device for providing access to a product or service (not shown).

Figure 2A:
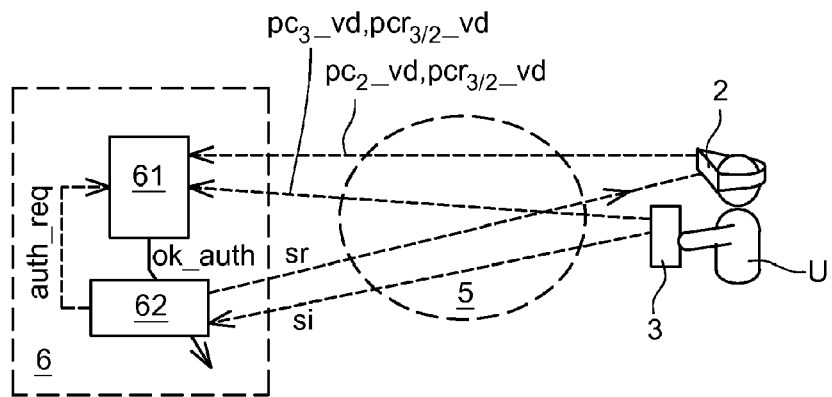
FIG. 2a, a simplified diagram of a first implementation mode of the authentication device according to the invention.
Figure 2B:
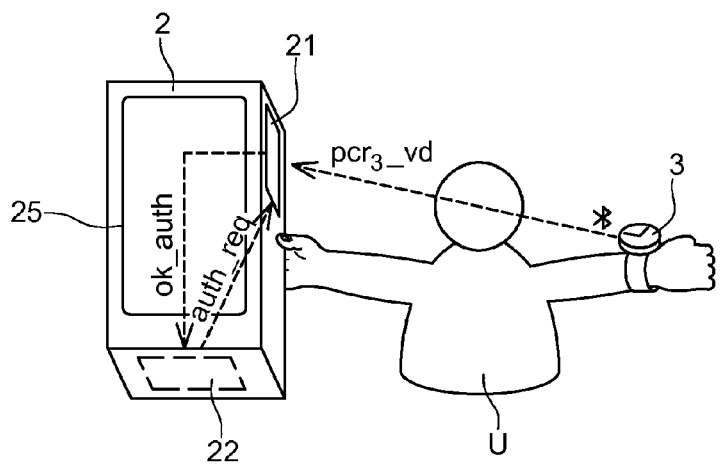
FIG. 2b, a simplified diagram of a second implementation mode of the authentication device according to the invention.
Figure 2C:
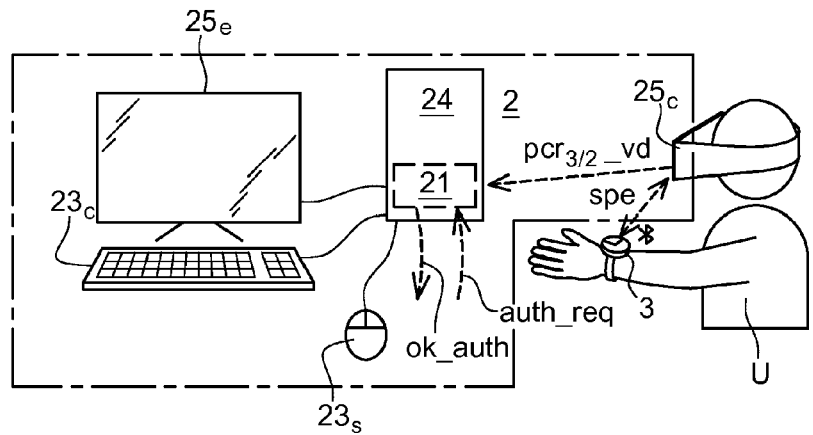
FIG. 2c, a simplified diagram of a third implementation mode of the authentication device according to the invention.

FIGS. 2a to 2c show different implementations of the authentication device according to the invention, in particular as shown in FIG. 1.

In particular, the first electronic device 2 is made up of one from among the following main portable devices:
a portable communication terminal;
a tablet;
a portable console;
a virtual reality headset;
an augmented reality headset.

In particular, the second electronic device 3 is made up of one from among the following secondary portable devices;
a portable peripheral;
a portable connected object;
a virtual reality joystick;
an augmented reality joystick.

In particular, the authentication device 1 according to the invention is adapted to the capabilities of the first electronic device of an immersive system (i.e., in particular of a virtual or augmented reality system, of a holographic or three-dimensional interactive system, etc.). Among the capabilities that can be exploited by the authentication device 1, the characteristic parameters are at least one of the following characteristic parameters:
the position and the orientation in space of the user via the headset, and of their hands via the joysticks and/or virtual reality gloves, and/or of their feet via virtual boots;
the accelerations and the speeds of movement of the headset, and of the joysticks and/or gloves and/or boots;
the position of the fingers on the joysticks and/or in the gloves and/or the boots;
the pressure exerted by the fingers on the various buttons of the joysticks and/or in the gloves and/or the boots;
etc.

Given the specificity of the capabilities for creating the authentication information made up of one or more value(s) of one or more relative characteristic parameter(s), the authentication model, i.e., the series of one or more value(s) of one or more stored relative characteristic parameter(s), is created with the same first electronic device and second electronic device used for authentication (for example, by the first electronic device and the second electronic device of the immersive system).

When they create their account, the user can select their authentication challenge from several possibilities, including:

the behavioral signature: the user must be able to reproduce a signature according to a model that they will have defined in two or three dimensions (with their hand, their foot, etc., depending on the location of the second electronic device). The one or more relative characteristic parameter(s) is/are then the position and/or the distance and/or the speed of movement and/or the acceleration. The higher the number of relative characteristic parameters and/or values used, the more stringent the level of authentication. The signature equally can be a symbol and a written word, in particular the name of the person and/or the drawing of a figure;

the body signature: the user must know how to reproduce a gesture or a series of precise gestures. The one or more relative characteristic parameter(s) are then the position and/or the distance. Optionally, the authentication can be made more stringent using an additional characteristic parameter, such as pressing a specific key of the joystick. An example of a body signature is: left arm up, right arm down (when using two joysticks or virtual reality gloves), pressing button A on the joystick or an area A of the virtual environment, and head to the right (with all these gestures being carried out simultaneously or successively depending on the recorded signature);

etc.

FIG. 2a shows a simplified diagram of a first implementation mode of the authentication device according to the invention.

In this first implementation mode, the authentication device 61 is implemented in a third electronic device 6, optionally remote from the first electronic device 2. If the third electronic device 6 is remote, it is connected to the first electronic device 2 via a communication network 5.

The third electronic device 6 is a personal electronic device in particular, placed in the home of the user, or a professional electronic device, placed in the office of the user while the user with the first electronic device D' is in a remote location, in particular in a second home, a rental accommodation, a hotel or on the premises of a partner, etc., or a service provider server, such as a website, an application, a content provider (video on demand, cloud, etc.).

In the example of FIG. 2a, the first electronic device 2 is an autonomous virtual reality headset and the second electronic device 3 is a joystick or virtual reality glove.

In particular, the third electronic device 6 comprises an access granting device 62.

The user U uses the first electronic device 2 and the second electronic device 3 to request access to a service or a product from an access granting device, for example, the device 62. The access granting device 62 requires the authentication auth_req of the user U from the authentication device 61 according to the invention.

The authentication device 61 receives and/or detects at least one value $pc_2\_vd$, $pc_3\_vd$ of at least one characteristic parameter or at least one value $pcr_{3/2}\_vd$ of at least one relative characteristic parameter, and, if applicable, computes at least one detected value $pcr_{3/2}\_vd$ of at least one relative characteristic parameter. Then, the authentication device 61 checks whether the at least one detected value $pcr_{3/2}\_vd$ of at least one relative characteristic parameter corresponds to the at least one stored value $pcr_{3/2}\_vm$ of at least one relative characteristic parameter.

In particular, if ok_auth is the case, then the authentication device 61 activates the access granting device 62.

The access granting device 62 then grants the first electronic device 2 access to the product or service. For example, the access granting device 62 sends a reproduction signal sr to the first electronic device 2, which reproduces the accessed service and/or an interaction menu with the accessed product or service. Thus, the second electronic device 3 allows an interaction signal si to be transmitted to the access granting device 62 as a function of the reproduction signal sr reproduced by the first electronic device 2.

FIG. 2b shows a simplified diagram of a second implementation mode of the authentication device according to the invention.

In this second implementation mode, the authentication device 21 is implemented in the first electronic device 2. The first electronic device 2 of the user U is connected to a second electronic device 3. The first electronic device 2 and the second electronic device 3 are separately portable by the user U. The first electronic device 2 therefore comprises:

a device 21 for authenticating the user of the first electronic device 2 that is capable of checking whether a detected value $pcr_{3/2}\_vd$ of a relative characteristic parameter of the second electronic device corresponds to a stored value $pcr_{3/2}\_vm$ of this relative characteristic parameter of the second electronic device associated with an identifier uid of a user requesting an authentication auth_req, with the relative characteristic parameter corresponding to the characteristic parameter of the second electronic device measured relative to the characteristic parameter of the first electronic device.

In the example of FIG. 2a, the first electronic device 2 is a smartphone and the second electronic device 3 is a smartwatch. The first electronic device 2 and the second electronic device 3 are particularly connected by a wireless local area network, such as Bluetooth.

The user U uses the first electronic device 2 and the second electronic device 3 to request access to a service or a product from an access granting device. For example, the user U wishes to access their smartphone or an application on their smartphone 2. In this case, the access granting device 22, 62 is respectively implemented in the smartphone 2 or in a third device 6 (not shown in FIG. 2b).

The access granting device 22, 62 requires the authentication auth_req of the user U from the authentication device 21 according to the invention (in particular, as shown in FIG. 1).

The authentication device 21 receives and/or detects at least one value $pc_2\_vd$, $pc_3\_vd$ (not shown) of at least one characteristic parameter, and, in this example of FIG. 2b, computes at least one detected value $pcr_{3/2}\_vd$ of at least one relative characteristic parameter. Then, the authentication device 21 checks whether the at least one detected value $pcr_{3/2}\_vd$ of at least one relative characteristic parameter matches the at least one stored value $pcr_{3/2}\_vm$ of at least one relative characteristic parameter.

In particular, if ok_auth is the case, the authentication device 21 activates the access granting device 22, 62.

The access granting device 22, 62 then grants the first electronic device 2 access to the smartphone 2 or to the product or service.

Thus, the user U of the smartphone 2 placed in a public environment is authenticated while reducing the risks of hacking their access and improving access reliability. Indeed, with the user U not entering a password, the risk of a third party retrieving the password by looking over their shoulder is reduced or even eliminated, especially when the authentication according to the invention is conducted over distances between the first electronic device and the second electronic device that depend on the morphology of the user. With these measures being simpler than fingerprint or facial recognition, not only are they more reliable, but the computation cost by the authentication device is also reduced.

FIG. 2c shows a simplified diagram of a third implementation mode of the authentication device according to the invention.

In this third implementation mode, the authentication device 21 is implemented either in a third electronic device 24, the first electronic device 25c of which is a peripheral, or directly in the first electronic device 25c comprising a peripheral 25c, such as a virtual or augmented reality headset. The first electronic device 2, 25c of the user U is connected to a second electronic device 3. The first electronic or peripheral device 25c of the first electronic device 2 and the second electronic device 3 are separately portable by the user U.

Either the first electronic device 2 or the third electronic device 24 comprises:
- a device 21 for authenticating the user of the first electronic device 25c, 2 capable of checking whether a detected value $pcr_{3/2}\_vd$ of a relative characteristic parameter of the second electronic device corresponds to a stored value $pcr_{3/2}\_vm$ of this relative characteristic parameter of the second electronic device associated with an identifier uid of a user requesting an authentication auth_req, with the relative characteristic parameter corresponding to the characteristic parameter of the second electronic device measured relative to the characteristic parameter of the first electronic device.

The third electronic device 24 is a personal computer or a tablet, etc., in particular, provided with one or more peripheral(s): reproduction interface(s), such as a screen $25_e$ and, if applicable, a headset $25_c$; input interface(s), such as a keyboard $23_c$, a mouse $23_s$, etc. In the example of FIG. 2c, the second electronic device 3 is a smartwatch.

The user U uses the headset $25_c$ and the second electronic device 3 to request access to a service or a product from an access granting device. The access granting device requests the authentication auth_req of the user U from the authentication device 21 according to the invention.

The authentication device 21 receives and/or detects at least one value $pc_2\_vd$, $pc_3\_vd$ (not shown) of at least one characteristic parameter or at least one value $pcr_{3/2}\_vd$ of at least one relative characteristic parameter, and, if applicable, computes at least one detected value $pcr_{3/2}\_vd$ of at least one relative characteristic parameter. Then, the authentication device 21 checks whether the at least one detected value $pcr_{3/2}\_vd$ of at least one relative characteristic parameter corresponds to the at least one stored value $pcr_{3/2}\_vd$ of at least one relative characteristic parameter.

In particular, if ok_auth is the case, the authentication device 21 activates the access granting device.

The access granting device then grants the first electronic device 2 access to the product or service, with said electronic device reproducing the granting of access using at least the headset $25_c$.

FIGS. 3a to 3d show the implementation of the authentication device according to the invention, in particular as shown in FIG. 1, for various characteristic parameters.

In particular, the relative characteristic parameter $pcr_{3/2}$ is made up of at least one of the following characteristic parameters pc:
- relative position $posr_{3/2}$ of the second electronic device relative to the first electronic device;
- relative distance $dr_{3/2}$ of the second electronic device relative to the first electronic device;
- relative orientation $or_{3/2}$, $\theta r_{3/2}$ of the second electronic device relative to the first electronic device;
- relative speed $vr_{3/2}$ of the second electronic device relative to the first electronic device;
- relative acceleration $ar_{3/2}$ of the second electronic device relative to the first electronic device.

Figure 3A:
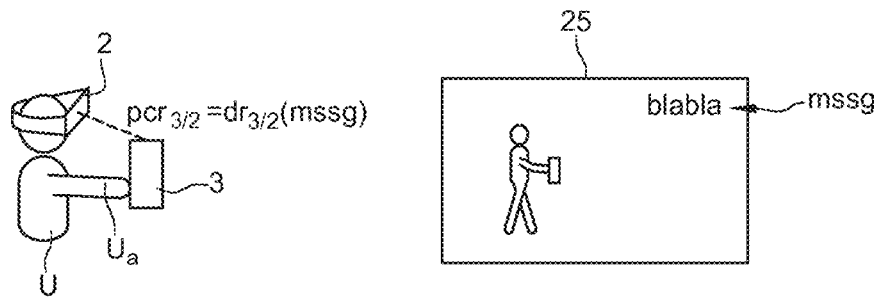
FIG. 3a, a simplified diagram of a first example of a characteristic parameter used by the authentication device according to the invention.

FIG. 3a shows a simplified diagram of a first example of a characteristic parameter used by the authentication device 1 according to the invention.

A user U of a first electronic device 2, for example, an autonomous virtual reality headset, and of a second electronic device 3, for example, a peripheral of the first electronic device 2, such as an interaction joystick or virtual reality garments: gloves, mitts, boots, etc., worn by the user U receives an authentication request message mssg.

In particular, the authentication request message mssg is reproduced by the first electronic device 2, for example, displayed on a screen 25 of the first electronic device 2. FIG. 3a shows an authentication request message mssg with a text "blabla" and optionally content: image or video. The authentication request message mssg particularly comprises indications of posture and/or behavior of the user for authentication. In this example, the authentication request message mssg indicates that the user must place their arm holding the joystick 3 outstretched in front of them.

In the example of FIG. 3a, the first authentication device 1 then uses a distance parameter as a characteristic parameter for comparing the detected value of the relative characteristic parameter made up of the relative distance of the second electronic device, i.e., the distance between the first electronic device 2 and the second electronic device 3, in the posture requested by the authentication request message mssg: $pcr_{3/2}=posr_{3/2}(mssg)$, with a value stored prior to the authentication request.

Figure 3B:
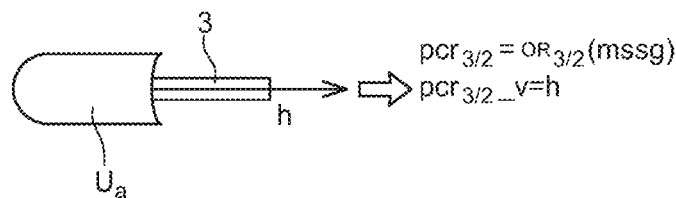
FIG. 3b, a simplified diagram of a second example of a characteristic parameter used by the authentication device according to the invention.

FIG. 3b shows a simplified diagram of a second example of a characteristic parameter used by the authentication device according to the invention.

In the example of FIG. 3b, the first authentication device 1 then uses an orientation parameter as a characteristic parameter for comparing the detected value $pcr_{3/2}\_vd=h$ of the relative characteristic parameter made up of the relative orientation of the second electronic device, i.e., a relative orientation between the first electronic device 2 and the second electronic device 3, as a function of the authentication request message mssg: $pcr_{3/2}=or_{3/2}(mssg)$, with a value stored prior to the authentication request. In this case, the detected value $pcr_{3/2}\_vd$ is a horizontal orientation h of the second electronic device 3, with it being understood that the reference is the orientation of the wearer of the headset 2. This orientation of the second electronic device 3 is obtained by an action of the user, who particularly changes the position of their arm Ua and of the joystick 3 as a function of the received authentication request message mssg.

In particular, the authentication device 1 checks that the successive detected values of the relative characteristic parameter match the successive stored values. In this case, the authentication request message mssg can tell the user to assume the nth posture of the series of authentication postures, either in the stored order or in a random order.

Figure 3C:
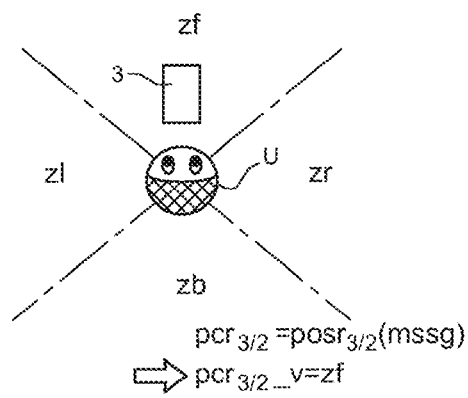
FIG. 3c, a simplified diagram of a third example of a characteristic parameter used by the authentication device according to the invention.

FIG. 3c shows a simplified diagram of a third example of a characteristic parameter used by the authentication device according to the invention.

In the example of FIG. 3c, the first authentication device 1 then uses a position parameter as a characteristic parameter for comparing the detected value $pcr_{3/2}\_vd=h$ of the relative characteristic parameter made up of the relative position of the second electronic device, i.e., a relative position between the first electronic device 2 and the second electronic device 3, as a function of the authentication request message mssg: $pcr_{3/2}=zr_{3/2}(mssg)$, with a value stored prior to the authentication request. In this case, the detected value $pcr_{3/2}\_vd$ corresponds to a frontal area fh of the second electronic device 3, with it being understood that the reference is the position of the wearer of the headset 2. This position of the second electronic device 3 is obtained by an action of the user, who particularly changes the position of the joystick 3 as a function of the received authentication request message mssg.

In particular, the position is defined by four predefined areas around the user in a two-dimensional space: frontal area zf, rear area zb, right lateral area zr and left lateral area zi, as shown in FIG. 3c, or by 6 areas in a three-dimensional space: in addition to the areas seen for the two-dimensional space zf, zb, zr, zl, the upper area za and the lower area zi.

In particular, the position is defined by several coded areas using the four cardinal points: north, south, west and east. For example, by defining a sphere around the first electronic device worn by the user, the upper hemisphere forms the northern area, the lower hemisphere forms the southern area underneath, the right hemisphere forms the eastern area, and the left hemisphere forms the western area (not shown). Thus, the position of the second electronic device can be indicated by NE type codes for north-east if it is placed in the upper right-hand quarter of the sphere, or even NNE for north-north-east, if it is placed in an upper section of the upper right-hand quarter of the sphere.

In particular, the authentication device 1 checks that the successive detected values of the relative characteristic parameter match the successive stored values. In this case, the authentication request message mssg can tell the user to assume the nth posture of the series of authentication positions, either in the stored order or in a random order.

Figure 3D:
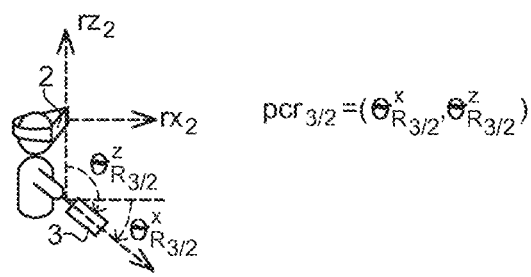
FIG. 3d, a simplified diagram of a fourth example of a characteristic parameter used by the authentication device according to the invention.

FIG. 3d shows a simplified diagram of a fourth example of a characteristic parameter used by the authentication device according to the invention.

In the example of FIG. 3d, the first authentication device 1 then uses an orientation parameter as a characteristic parameter for comparing the detected value $pcr_{3/2}\_vd=\theta r_{3/2}\_vd$ of the relative characteristic parameter made up of the relative orientation of the second electronic device, i.e., a relative orientation between the first electronic device 2 and the second electronic device 3, as a function of the authentication request message mssg: $pcr_{3/2}=\theta r_{3/2}(mssg)$, with a value stored prior to the authentication request. In this case, the detected value $pcr_{3/2}\_vd$ is an orientation with a determined angle $\theta r_{3/2}$ of the second electronic device 3, with it being understood that the reference is the orientation of the wearer of the headset 2. This orientation of the second electronic device 3 is obtained by an action of the user, who particularly changes the position of their arm Ua and of the joystick 3 as a function of the received authentication request message mssg.

The reference can be in a two-dimensional or three-dimensional space, as shown in FIG. 3D. In this case, with the first electronic device 2 being a headset, the angle of the second device 2 is detected relative to a horizontal viewing plane $rx_2$ that yields a first angle, called longitudinal angle $\theta^x r_{3/2}$, and/or relative to a vertical plane $rz_2$ corresponding to the user that yields a second angle, called longitudinal angle $\theta^z r_{3/2}$. Then, the relative characteristic parameter is a pair of angles $pcr_{3/2}=(\theta^x r_{3/2}, \theta^z r_{3/2})$.

In particular, the authentication device 1 checks that the successive detected values of the relative characteristic parameter match the successive stored values. In this case, the authentication request message mssg can tell the user to assume the nth posture of the series of authentication postures, either in the stored order or in a random order.

In particular, the various postures are linked with a rate, a speed and/or accelerations that also can be detected and made up of characteristic parameters.

Figure 4:
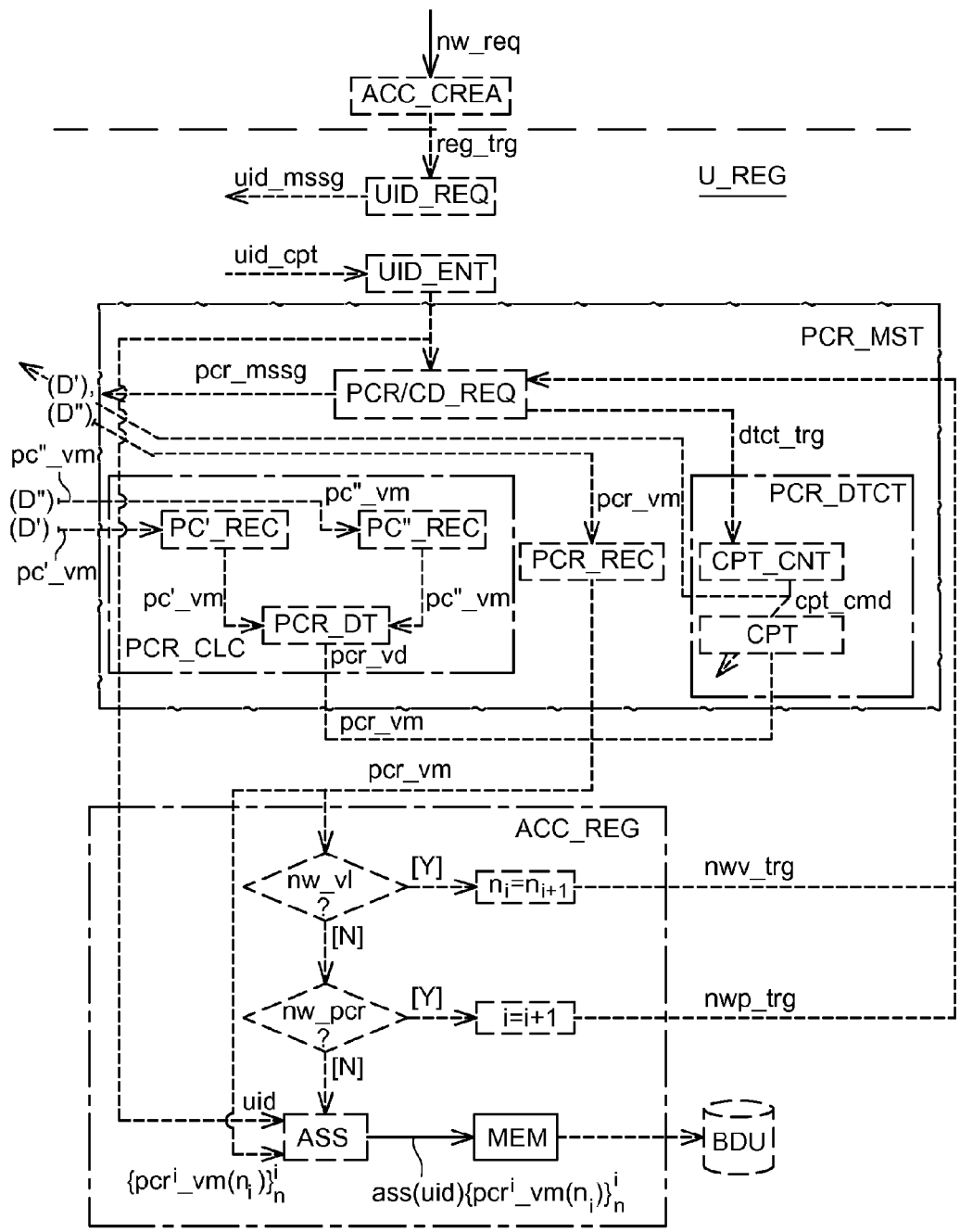
FIG. 4, a simplified diagram of a method for registering a user according to the invention.

FIG. 4 shows a simplified diagram of a method for registering a user according to the invention, The method U_REG for registering a user U of a first electronic device D' connected to a second electronic device D" allows a user account to be registered in connection with secure access to a product or a service. The first electronic device D' and the second electronic device D" are separately portable by the user U. The registration method U_REG comprises:

storing in a memory MEM, in combination with an identifier uid of the user, at least one value pcr_vm of a relative characteristic parameter of the second electronic device, with the relative characteristic parameter pcr corresponding to the characteristic parameter pc" of the second electronic device measured relative to the characteristic parameter pc' of the first electronic device.

In particular, the registration method U_REG comprises:
measuring PCR_MST at least one value pcr_vm of the relative characteristic parameter of the second electronic device, with the measured value pcr_vm being stored in a memory MEM directly or indirectly.

In particular, the registration method U_REG comprises:
computing PCR_DT a statistical value of the relative characteristic parameter of the second electronic device, with the statistical value pcr_vm being stored in a memory MEM.

In particular, a method for accessing a service or a device receives a first access request or a request nw_req to generate an access account. In particular, the access method (not shown) comprises an access creation step ACC_CREA that triggers reg_trg the registration U_REG of the user.

In particular, the user registration method U_REG comprises the access creation step ACC_CREA, in particular when the access method implements the steps of the registration method U_REG.

In particular, the registration method comprises a request UID_REQ for a user identifier that sends an identification message uid_mssg to the user U. The identification message uid_mssg is particularly able to be reproduced by a reproduction interface.

Following the reproduction of the identification message uid_mssg, the user provides an input interface, such as an entry interface: keyboard, mouse, stylus, touch screen, etc., or a sensor: camera, microphone, etc., with a user identifier uid. The user identifier uid is particularly a name, a pseudonym, an email address, a terminal identifier of the user, such as a telephone number, etc.

In particular, the registration method U_REG comprises an input UID_ENT of the user identifier receiving a signal uid_cpt from the input interface comprising a user identifier uid.

In particular, measuring PCR_MST at least one value of the relative characteristic parameter of the second electronic device comprises a request PCR/CD_REQ to provide the access code, also called authentication code, that sends a message pcr_mssg to the user U for registering an authentication code. The message pcr_mssg for registering an authentication code is particularly able to be reproduced by a reproduction interface.

In particular, the registration method U_REG comprises receiving PCR_REC at least one relative characteristic parameter. In particular, the measurement PCR_MST comprises receiving PCR_REC at least one relative characteristic parameter.

In particular, the registration method U_REG comprises detecting PCR_DTC at least one relative characteristic parameter particularly triggered dtct_trg by the request PCR/CD_REQ to provide the authentication code. In particular, the measurement PCR_MST comprises detecting PCR_DTC at least one relative characteristic parameter.

In particular, detecting PCR_DTC at least one relative characteristic parameter comprises capturing CPT a relative characteristic parameter. Detecting PCR_DTC at least one relative characteristic parameter particularly comprises a capture control step CPT_CNT commanding cpt_cmd the capturing CPT and/or one or more capturing step(s) implemented by the first electronic device D' and/or the second electronic device D".

In particular, the registration method U_REG comprises computing PCR_CLC at least one relative characteristic parameter. In particular, the measurement PCR_MST comprises computing PCR_CLC at least one relative characteristic parameter.

In particular, computing PCR_CLC at least one relative characteristic parameter comprises receiving PC'_REC a first characteristic parameter PC' originating from the first electronic device D', receiving PC"_REC a second characteristic parameter PC" originating from the second electronic device D", and determining PCR_DT the relative characteristic parameter as a function of the received detected values pc'_vm and pc"_vm.

In particular, the registration method U_REG comprises registering ACC_REG the access code included in the memory MEM. In particular, the registration method U_REG, in particular, the registration ACC_REG of the access code, comprises, before being stored in the memory MEM, associating ASS one or more measured value(s) $\{pcr^i\_vm(n)\}_{n=1\ldots N}^{i=1\ldots I}$ of one or more relative characteristic parameter(s) with the entered user identifier uid.

In particular, the registration ACC_REG of the access code checks whether the access code requires a value nw_vl? of the relative characteristic parameter in addition to the measured value pcr_vm. If yes [Y], a new measurement pcr_vm(n) of the relative characteristic parameter is triggered nwv_trg by iterating n=n+1 as the relative characteristic parameter.

In particular, the registration ACC_REG of the access code checks whether the access code requires a value nw_pcr? of another relative characteristic parameter in addition to the measured value pcr_vm. If yes [Y], a measurement $pcr^i\_vm$ of a new relative characteristic parameter is triggered nwp_trg by iterating i=i+1 as the type of relative characteristic parameter. Otherwise, all the measured values $\{pcr^i\_vm(n)\}_{n=1\ldots N}^{i=1\ldots I}$ are directly made available to the memory MEM in order to be stored in combination with the user identifier uid.

In the case whereby several values of several characteristic parameters are used for the access code, if the access code does not [N] require a value nw_vl? of the relative characteristic parameter in addition to the measured value pcr_vm, then checking nw_pcr? the iteration of the type of characteristic parameter type is implemented.

In particular, the measured values $\{pcr^i\_vm(n)\}_{n=1\ldots N}^{i=1\ldots I}$ of the relative characteristic parameters are stored in a user database BDU.

In particular, the authentication device 1 according to the invention and/or an access granting device 62 implements the steps of the registration method U_REG.

One embodiment of the registration method U_REG is a program comprising program code instructions for executing the steps of the registration method when said program is executed by a processor.

Figure 5:
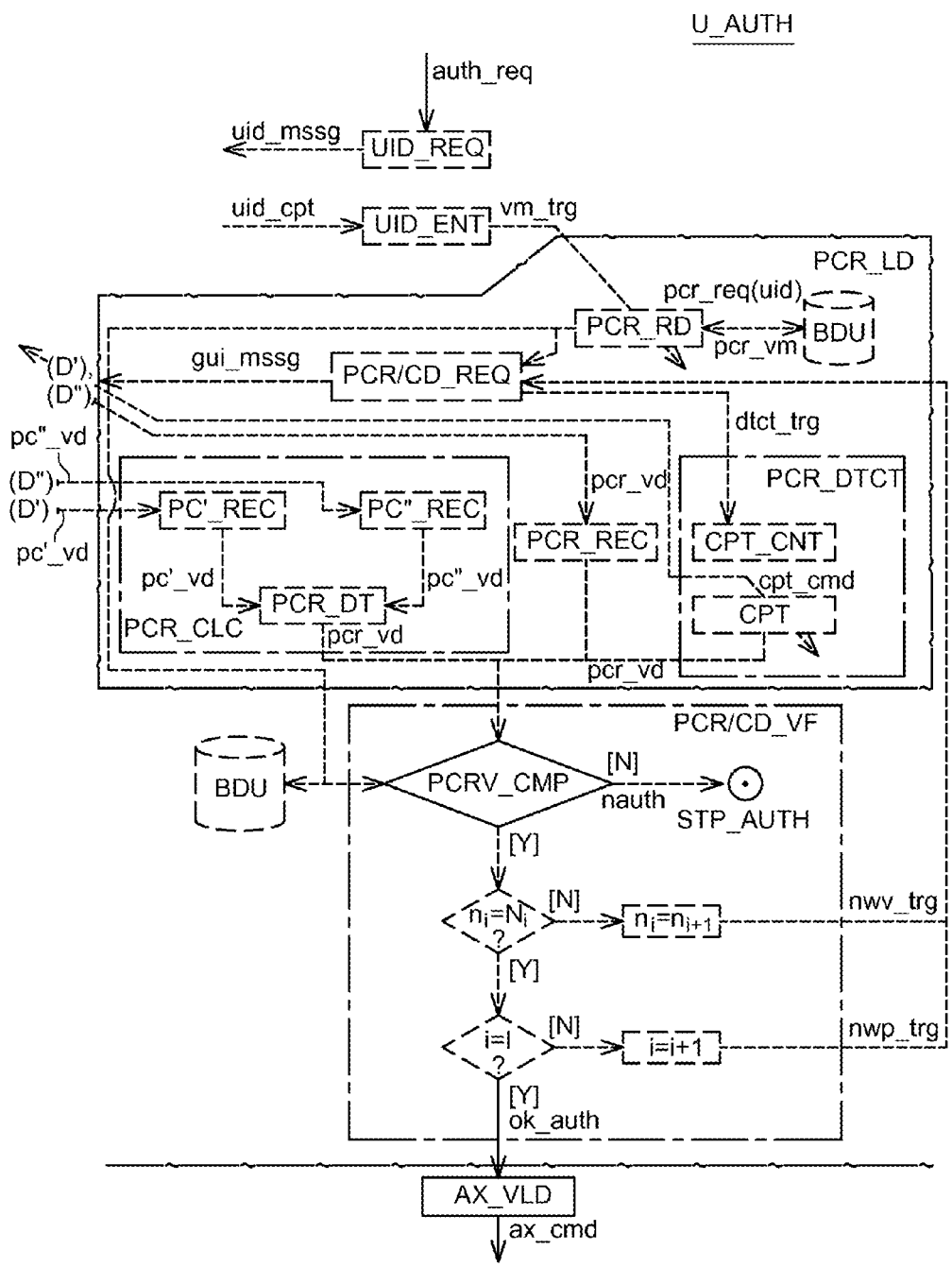
FIG. 5, a simplified diagram of an authentication method according to the invention.

FIG. 5 shows a simplified diagram of an authentication method according to the invention.

The method U_AUTH for authenticating a user of a first electronic device D' connected to a second electronic device D" allows the user U to be authenticated, particularly when accessing a device or a service. The first electronic device D' and the second electronic device D" are separately portable by the user U. The authentication method U_AUTH comprises:

checking PCRV_CMP if a detected value pcr_vd of a relative characteristic parameter of the second electronic device corresponds to a stored value pcr_vm of this relative characteristic parameter of the second electronic device associated with an identifier uid of a user requesting authentication auth_req, with the relative characteristic parameter pcr corresponding to the characteristic parameter pc" of the second electronic device measured relative to the characteristic parameter pc' of the first electronic device.

In particular, the authentication method U_AUTH comprises:

retrieving PCR_LD at least one detected value pcr_vd of the relative characteristic parameter of the second electronic device, with the detected value pcr_vd being checked PCR_CMP.

In particular, the authentication method U_AUTH comprises:

computing PCR_DT a detected value pcr_vd of the relative characteristic parameter of the second electronic device on the basis of a detected value pc'_vd of the characteristic parameter of the first electronic device and of a detected value pc"_vd of the characteristic parameter of the first electronic device, with the statistical value pcr_vd being stored and checked PCR_CMP.

In particular, a method for accessing a service or a device receives an access request acc_req (not shown). In particular, the access request triggers an authentication request auth_req before the access method grants access.

In particular, the authentication method U_AUTH comprises receiving AUTH_REC an authentication request (not shown).

In particular, the authentication method U_AUTH comprises a request UID_REQ for a user identifier that sends an identification message uid_mssg to the user U. The identification message uid_mssg is particularly able to be reproduced by a reproduction interface. The user identifier request UID_REQ is particularly triggered by the authentication request auth_req.

Following the reproduction of the identification message uid_mssg the user provides an input interface, such as an entry interface: keyboard, mouse, stylus, touch screen, etc., or a sensor: camera, microphone, etc., with a user identifier uid. The user identifier uid is particularly a name, a pseudonym, an email address, a terminal identifier of the user, such as a telephone number, etc.

In particular, the authentication method U_AUTH comprises an input UID_ENT of the user identifier receiving a signal uid_cpt from the input interface comprising a user identifier uid.

In particular, retrieving PCR_LD at least one value of the relative characteristic parameter of the second electronic device comprises a request PCR/CD_REQ to provide the access code, also called authentication code, that sends a guidance message gui_mssg to the user U. The guidance message gui_mssg is particularly able to be reproduced by a reproduction interface.

In particular, retrieving PCR_LD comprises reading PCR_RD stored values pcr_vm of relative characteristic parameters associated with the entered user identifier uid. In particular, reading PCR_RD is triggered vm_trg by entering UID_ENT the user identifier.

In particular, reading PCR_REQ involves sending a request pcr_req(uid) for associated relative characteristic parameters to a memory device, such as a user database BDU, in which values have been previously stored. In response, reading PCR_REQ involves receiving associated relative characteristic parameter values pcr_vm from the user database BDU.

In particular, reading PCR_REQ involves sending read associated relative characteristic parameter values pcr_vm to the request PCR/CD_REQ for providing the access code. In particular, the request PCR/CD_REQ for providing the access code generates a guidance message gui_mssg as a function of the one or more characteristic parameter(s) pcr for which the values pcr_vm have been read.

Thus, the user U can be guided by the guidance message gui_mssg to obtain the relative characteristic parameters forming the access code.

In particular, the authentication method U_AUTH comprises receiving PCR_REC at least one relative characteristic parameter. In particular, retrieving PCR_LD comprises receiving PCR_REC at least one relative characteristic parameter.

In particular, the authentication method U_AUTH comprises detecting PCR_DTC at least one relative characteristic parameter that is particularly triggered dtct_trg by the request PCR/CD_REQ for providing the authentication code. In particular, retrieving PCR_LD comprises detecting PCR_DTC at least one relative characteristic parameter.

In particular, detecting PCR_DTC at least one relative characteristic parameter comprises capturing CPT a relative characteristic parameter. Detecting PCR_DTC at least one relative characteristic parameter particularly comprises a capture control step CPT_CNT commanding cpt_cmd capturing CPT and/or one or more capturing step(s) implemented by the first electronic device D' and/or the second electronic device D".

In particular, the authentication method U_AUTH comprises computing PCR_CLC at least one relative characteristic parameter. In particular, retrieving PCR_LD comprises computing PCR_CLC at least one relative characteristic parameter.

In particular, computing PCR_CLC at least one relative characteristic parameter comprises receiving PC'_REC a first characteristic parameter PC' originating from the first electronic device D', receiving PC"_REC a second characteristic parameter PC" originating from the second electronic device D", and determining PCR_DT the relative characteristic parameter as a function of the received detected values pc'_vd and pc"_vd.

In particular, the authentication method U_AUTH comprises checking PCR/CD_VF the access code that comprises checking PCRV_CMP values.

In particular, checking PCR/CD_VF the access code involves checking whether all the values of the code have been detected $n_j=N_i$?. If not [N], the retrieval PCR_LD of a new value of the relative characteristic parameter is triggered nwv_trg by iterating $n_j=n_j+1$ as the value pcr_vm($n_i$) of the relative characteristic parameter.

In particular, checking PCR/CD_VF the access code involves checking whether the values of all the relative characteristic parameters have been detected i=I?. If not [N], the retrieval PCR_LD of a value pcr$^j$_vm of a new relative characteristic parameter is triggered nwp_trg by iterating i=i+1 as the type of relative characteristic parameter. Otherwise [Y], checking PCR/CD_VF the access code indicates that the authentication is successful ok_auth.

In the case whereby several values of several characteristic parameters are used for the access code, if the access code requires [Y] a value of the relative characteristic parameter in addition $n_j=N_i$? to the measured value pcr_vm ($n_i$), then checking the iteration of the type of characteristic parameter i=I? is implemented.

In particular, if checking PCRV_COMP the value is positive [Y], i.e., if a detected value of a relative characteristic parameter corresponds to the stored value of the relative characteristic parameter: pcr$^j$_vd($n_i$)=pcr$_{vm(n_j)}^i$, then checking the number of detected values of the relative characteristic parameter $n_j=N_i$? is carried out.

Otherwise, i.e., if checking PCRV_COMP a value is negative [N], if at least one detected value of at least one relative characteristic parameter does not correspond to the stored value of the relative characteristic parameter of the access code: pcr$^j$_vd($n_i$)≠pcr$_{vm(n_j)}^i$, then checking PCRV_COMP the value indicates an authentication failure nauth.

In particular, checking PCRV_COMP the value involves reading a stored value pcr_vm as a function of the detected value pcr_vd of the relative characteristic parameter in a user database BDU. Alternatively, checking PCRV_COMP a value involves receiving a stored value pcr_vm from the reading step PCR_RD.

In particular, the authentication failure nauth closes CLT_AUTH the authentication method U_AUTH. Optionally, the authentication closure STP_AUTH sends a failure message reproduced by the first electronic device D' to the user.

In particular, the authentication closure STP_AUTH resets the authentication method U_AUTH, which then restarts with the user identifier request UID_REQ and/or the retrieval PCR_LD of the access code and/or the request PCR/CD_REQ to provide the authentication code.

In particular, the successful authentication indication ok_auth is made available to an access method AXP (not shown), in particular an access method AXP that sent the authentication request auth_req to the authentication method U_AUTH.

In particular, the successful authentication indication ok_auth triggers a validation of an access AX_VLD to a service or a device. In particular, an access method AXP (not shown), such as an access method AXP that sent the authentication request auth_req to the authentication method U_AUTH, comprises the access validation step AX_VLD. The access validation step AX_VDL commands ax_cmd the access AXP by the device requesting access, in this invention the first electronic device D', to a device or service.

In particular, the authentication device 1 according to the invention and/or an access granting device 62 implements the steps of the authentication method U_AUTH.

One embodiment of the authentication method U_AUTH is a program comprising program code instructions for executing the steps of the authentication method U_AUTH when said program is executed by a processor.

The invention also relates to a medium. The information medium can be any entity or device capable of storing the program. For example, the medium can comprise a storage means, such as a ROM, for example, a CD-ROM or a microelectronic circuit ROM or even a magnetic recording means, for example, a floppy disk or a hard disk.

Moreover, the information medium can be a transmissible medium, such as an electrical or optical signal that can be routed via an electrical or optical cable, by radio or by other means. The program according to the invention particularly can be downloaded over a network, in particular of the Internet type.

Alternatively, the information medium can be an integrated circuit, in which the program is incorporated, with the circuit being capable of executing or being used for executing the method in question.

In another implementation, the invention is implemented by means of software and/or hardware components. In this respect, the term module can equally correspond to a software component or to a hardware component. A software component corresponds to one or more computer program(s), one or more sub-program(s) of a program, or more generally to any element of a program or software capable of implementing a function or a set of functions according to the above description. A hardware component corresponds to any element of a hardware assembly (or hardware) capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. An authentication device for authenticating a user of a first electronic device connected to a second electronic device, the first electronic device and the second electronic device being separately portable by the user, the authentication device for authenticating the user of the first electronic device comprising:
   an authentication processor; and
   a non-transitory computer readable medium comprising authentication instructions stored thereon which when executed by the authentication processor configure the authentication device to:
   check by comparing:
      a detected value of a relative characteristic parameter of the second electronic device, which is measured relative to a characteristic parameter of the first electronic device,
      to a stored value of this relative characteristic parameter of the second electronic device associated with an identifier of the user requesting an authentication, the stored value of the relative characteristic parameter corresponding to the characteristic parameter of the second electronic device measured relative to the characteristic parameter of the first electronic device.

2. The authentication device as claimed in claim 1, wherein the instructions configure the device to check whether a series of detected values of the relative characteristic parameter of the second electronic device corresponds to a series of stored values of this relative characteristic parameter of the second electronic device associated with an identifier of the user requesting authentication.

3. The authentication device as claimed in claim 1, wherein the instructions configure the device to check the values of a plurality of relative characteristic parameters of at least one second electronic device.

4. The authentication device as claimed in claim 1, wherein the authentication device comprises at least one device from among devices for providing the relative characteristic parameter of the second electronic device, consisting of:
   a detector for detecting the relative characteristic parameter of the second electronic device;
   a receiver for receiving a detected value of the relative characteristic parameter of the second electronic device originating from a detector for detecting the relative characteristic parameter of the second electronic device implemented in the second electronic device;
   a receiver for receiving a detected value of the relative characteristic parameter of the second electronic device originating from a detector for detecting the relative characteristic parameter of the second electronic device implemented in the first electronic device;
   a computer for computing a detected value of the relative characteristic parameter of the second electronic device comprising:
      a receiver for receiving the detected value of the characteristic parameter of the second electronic device originating from the second electronic device and a detected value of the characteristic parameter of the first electronic device originating from the first electronic device; and
      a basic computer configured to determine a value of the relative characteristic parameter of the second electronic device as a function of the received detected value of the characteristic parameter of the second electronic device and of the received detected value of the characteristic parameter of the first electronic device.

5. The authentication device as claimed in claim 4, wherein the authentication device comprises the detector and the detector comprises:
   a controller configured to command at least one remote sensor for detecting values of the characteristic parameter of a remote device, with the sensor being implemented in the remote device.

6. The authentication device as claimed in claim 4, wherein the authentication device comprises the detector and the detector comprises:
   a sensor capable of measuring a value of the relative characteristic parameter of the second electronic device.

7. The authentication device as claimed in claim 1, wherein the relative characteristic parameter is made up of at least one of the following characteristic parameters:
   relative position of the second electronic device relative to the first electronic device;
   relative distance of the second electronic device relative to the first electronic device;
   relative orientation of the second electronic device relative to the first electronic device;
   relative speed of the second electronic device relative to the first electronic device;
   relative acceleration of the second electronic device relative to the first electronic device.

8. The authentication device as claimed in claim 1, wherein the first electronic device is made up of one from among the following main portable devices:
- a portable communication terminal;
- a tablet;
- a portable console;
- a virtual reality headset;
- an augmented reality headset.

9. The authentication device as claimed in claim 1, wherein the second electronic device is made up of one from among the following secondary portable devices:
- a portable peripheral;
- a portable connected object;
- a virtual reality joystick;
- an augmented reality joystick.

10. A first electronic device of a user, with the first electronic device of the user being connectable to a second electronic device, with the first electronic device and the second electronic device being separately portable by the user, the first electronic device comprising:
- a processor; and
- a non-transitory computer readable medium comprising instructions stored thereon which when executed by the processor configure the device to authenticate by comparing:
- a detected value of a relative characteristic parameter of the second electronic device, which is measured relative to a characteristic parameter of the first electronic device,
- to a stored value of this relative characteristic parameter of the second electronic device associated with an identifier of the user requesting an authentication, the stored value of the relative characteristic parameter corresponding to the characteristic parameter of the second electronic device measured relative to the characteristic parameter of the first electronic device.

11. A method for authenticating a user of a first electronic device connected to a second electronic device, with the first electronic device and the second electronic device being separately portable by the user, the authentication method being implemented by an authentication device to authenticate the user of the first electronic device and comprising:
comparing:
- a detected value of a relative characteristic parameter of the second electronic device, which is measured relative to a characteristic parameter of the first electronic device,
- to a stored value of this relative characteristic parameter of the second electronic device associated with an identifier of the user requesting an authentication, the stored value of the relative characteristic parameter corresponding to the characteristic parameter of the second electronic device measured relative to the characteristic parameter of the first electronic device.

12. A method comprising:
registering a user of a first electronic device connected to a second electronic device, with the first electronic device and the second electronic device being separately portable by the user, the registration method comprising:
storing, in combination with an identifier of the user, at least one value of a relative characteristic parameter of the second electronic device, the relative characteristic parameter corresponding to the characteristic parameter of the second electronic device measured relative to a characteristic parameter of the first electronic device.

13. The registration method as claimed in claim 12, the registration method comprising:
measuring at least one value of the relative characteristic parameter of the second electronic device, with the measured value being stored directly or indirectly.

14. The registration method as claimed in claim 13, the registration method comprising:
computing a statistical value of the relative characteristic parameter of the second electronic device, with the statistical value being stored.

15. A non-transitory computer readable medium comprising a program stored there comprising program code authentication instructions which when executed by a processor of an authentication device configure the authentication device to:
authenticating a user of a first electronic device connected to a second electronic device, the first electronic device and the second electronic device being separately portable by the user, the authenticating the user of the first electronic device comprising:
comparing:
- a detected value of a relative characteristic parameter of the second electronic device, which is measured relative to a characteristic parameter of the first electronic device,
- to a stored value of this relative characteristic parameter of the second electronic device associated with an identifier of the user requesting an authentication, the stored value of the relative characteristic parameter corresponding to the characteristic parameter of the second electronic device measured relative to the characteristic parameter of the first electronic device.

* * * * *